United States Patent [19]
Hsu

[11] Patent Number: 5,863,015
[45] Date of Patent: Jan. 26, 1999

[54] MICROPHONE STAND ELEVATING DEVICE

[76] Inventor: Hsin-Hsuan Hsu, 11 Kung-5th Rd., Kung-2nd Industrial Zone, Lin-Kou Hsiang, Taipei Hsien, Taiwan

[21] Appl. No.: 911,012

[22] Filed: Aug. 14, 1997

[51] Int. Cl.[6] .................................................. F16M 11/00
[52] U.S. Cl. ...................................... 248/157; 248/188.2
[58] Field of Search ................................ 248/157, 183.3, 248/188.2, 188.5, 161

[56] References Cited

U.S. PATENT DOCUMENTS

| | | | |
|---|---|---|---|
| 5,072,910 | 12/1991 | May | 248/188.2 |
| 5,351,978 | 10/1994 | Chen | 248/188.2 |
| 5,549,264 | 8/1996 | West | 248/157 |

*Primary Examiner*—Leslie A. Braun
*Assistant Examiner*—Robert Lipesik
*Attorney, Agent, or Firm*—Bacon & Thomas, PLLC

[57] ABSTRACT

A type of "improvement on microphone stand elevating device", comprising a base stand, an outer tube, an inner tube and a fixing joint; the outer tube is installed on the base stand; the inner tube is installed on the outer tube, with its top to accommodate the microphone piece, characterized in that: a fixing joint, comprising a main body, a fixing block and a pressing lever; the main body has a through hole to enable its mounting on top of the outer tube; one side of the main body has a depressed chamber; on the depressed chamber is an open hole communicating with the through hole; a fixing block, its front end is a pushing part; said pushing part corresponds to the open hole in the depressed chamber, its front slightly extending to the through hole, so the fixing block may be fitted onto the open hole; a pressing lever, its center part is hinge joined to the center part of the depressed chamber; between the bottom part of said pressing lever and the depressed chamber is a compressed spring; so the front part of said pressing lever may push the fixing block, to fix the inner tube in the main body; so designed that the height of the microphone stand can be adjusted by pressing on the bottom part of the pressing lever.

4 Claims, 3 Drawing Sheets

MICROPHONE STAND ELEVATING DEVICE

BACKGROUND OF THE INVENTION

The subject invention relates to a type of "improvement on microphone stand elevating device", particularly to one enabling convenient, simple and rapid adjustment of the height of a microphone stand.

DESCRIPTION OF PRIOR ART

Conventionally, a prior art of microphone stand is normally composed of a base stand, an outer tube, an inner tube and a fixing joint; wherein, the outer tube is installed on the base stand; on top of the outer tube is installed an inner tube; on top of the inner tube is a microphone holder to hold the microphone; the fixing joint has a through hole to enable its mounting on the connection of the outer tube and the inner tube; and on the side of the fixing joint is a screw hole; said screw hole communicates with the through hole to accommodate a bolt which will press the wall of the inner tube to tighten the inner tube.

However, to adjust the height of the inner tube in said conventional composition, the user must loosen and tighten the bolt, which is labor and time consuming and inconvenient; furthermore, a large portion of said bolt is protruding on the outside; the result is bad appearance; and the front end of the bolt will often scrape and damage the wall of the inner tube during its loosening and tightening processes.

In view of the above weaknesses, the subject inventor has devoted much time and effort in the research and creation, and has finally designed a type of "improvement on microphone stand elevating device".

SUMMARY OF THE INVENTION

The primary purpose of the subject invention is to provide a type of "improvement on microphone stand elevating device", enabling convenient, easy and rapid adjustment of the height of a microphone stand.

To achieve the above purpose, the subject invention is mainly composed of a base stand, an outer tube, an inner tube and a fixing joint; wherein, the outer tube is installed on the base stand; the inner tube is installed on the outer tube, with its top joined to a microphone holder; characterized in that: a fixing joint, comprising a main body, a fixing block and a pressing lever; wherein:

The main body has a through hole on one verticle side; the inner diameters of the upper half and the lower half of the through hole correspond to the diameters of the inner tube and the outer tube, to enable the main body to be mounted on top of the outer tube and the inner tube. On the other side of said main body is a depressed chamber. On the upper part of the depressed chamber is an open hole that communicates with the through hole.

The front of the fixing block is a pushing part; said pressing part corresponds to the open hole in the depressed chamber, and its front part slightly extends into the through hole; so the fixing block may be fitted onto the open hole in the depressed chamber;

The center part of the pressing lever is hinge joined to the center part of the depressed chamber of the main body. Between the bottom part of said pressing lever and the recess of the main body is a compressed spring, so the front part of the pressing lever pushes against the fixing block, to tighten the inner tube inside the main body; so that the height of the microphone stand may be adjusted simply by pressing on the bottom of the pressing lever.

To enable your better understanding of the integral construction, installation, characteristics and functions, etc. of the subject invention, the preferred embodiment of the subject invention is described in details below with drawings:

DETAILED DESCRIPTION OF PREFERRED EMBODIMENT

Figure 1:
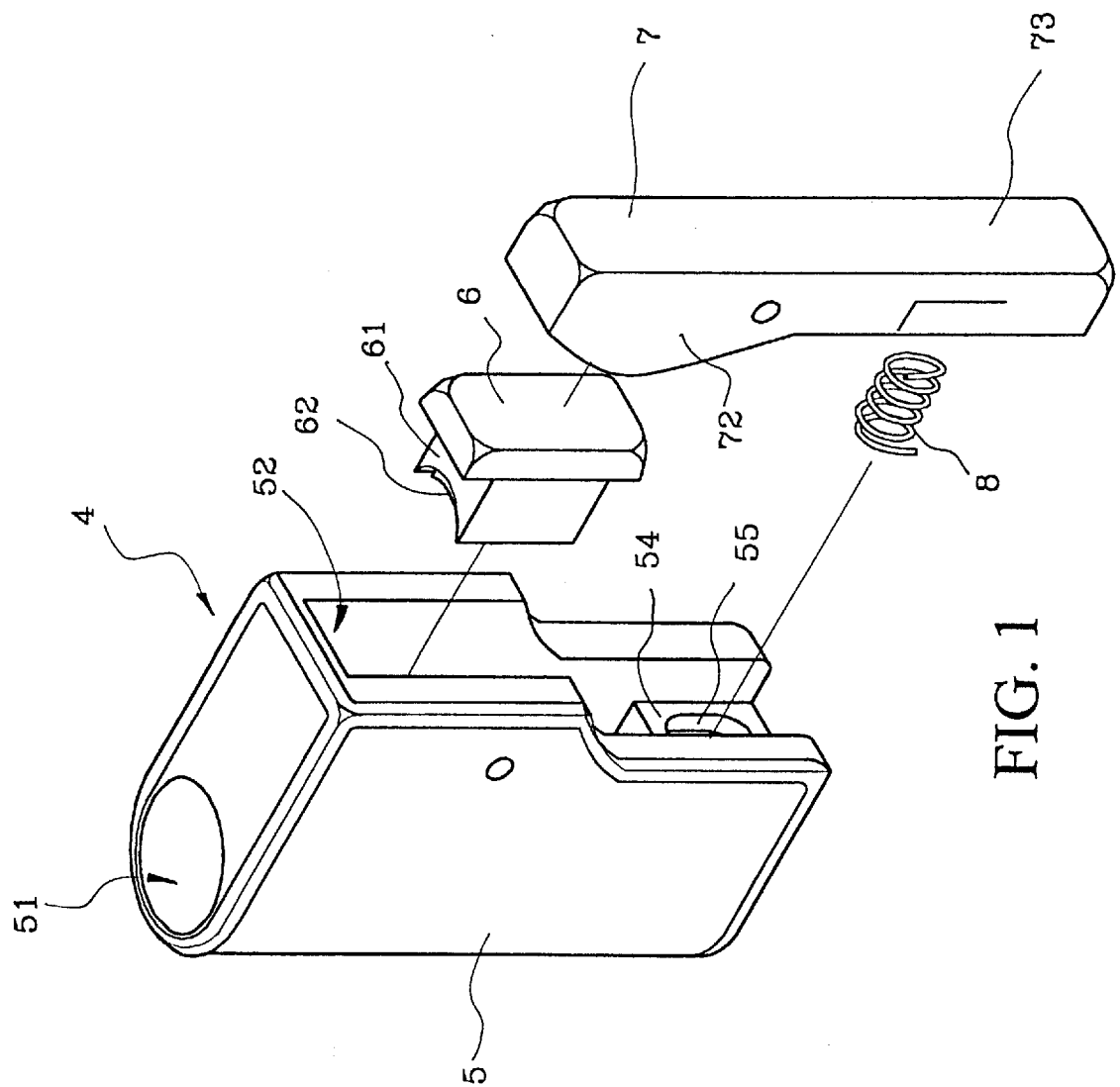
FIG. 1 is an exploded view of the fixing joint in the subject invention.
Figure 2:
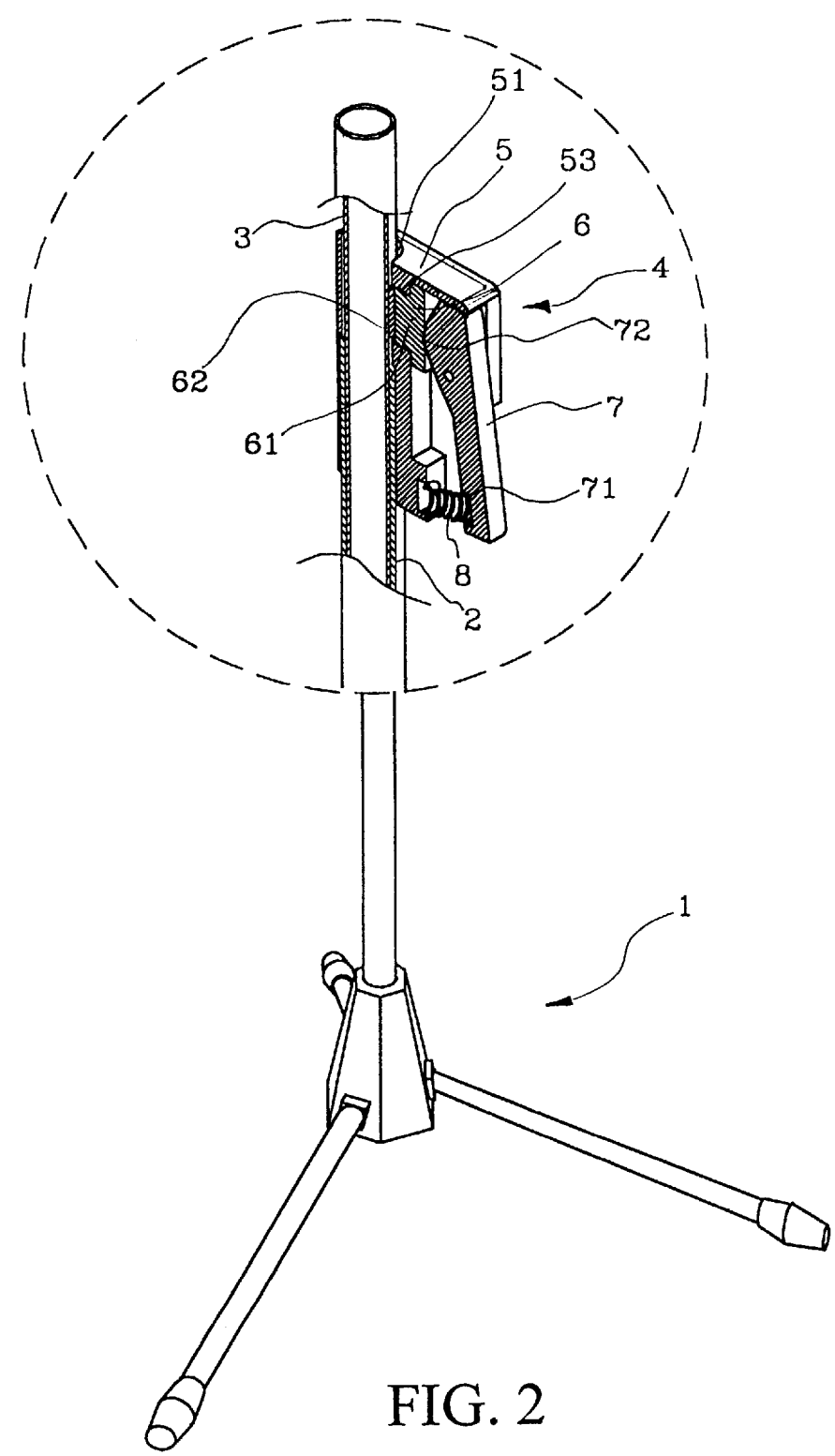
FIG. 2 is a perspective view of an embodiment of the fixing joint that is used to fix the inner tube on the microphone stand.
Figure 3:
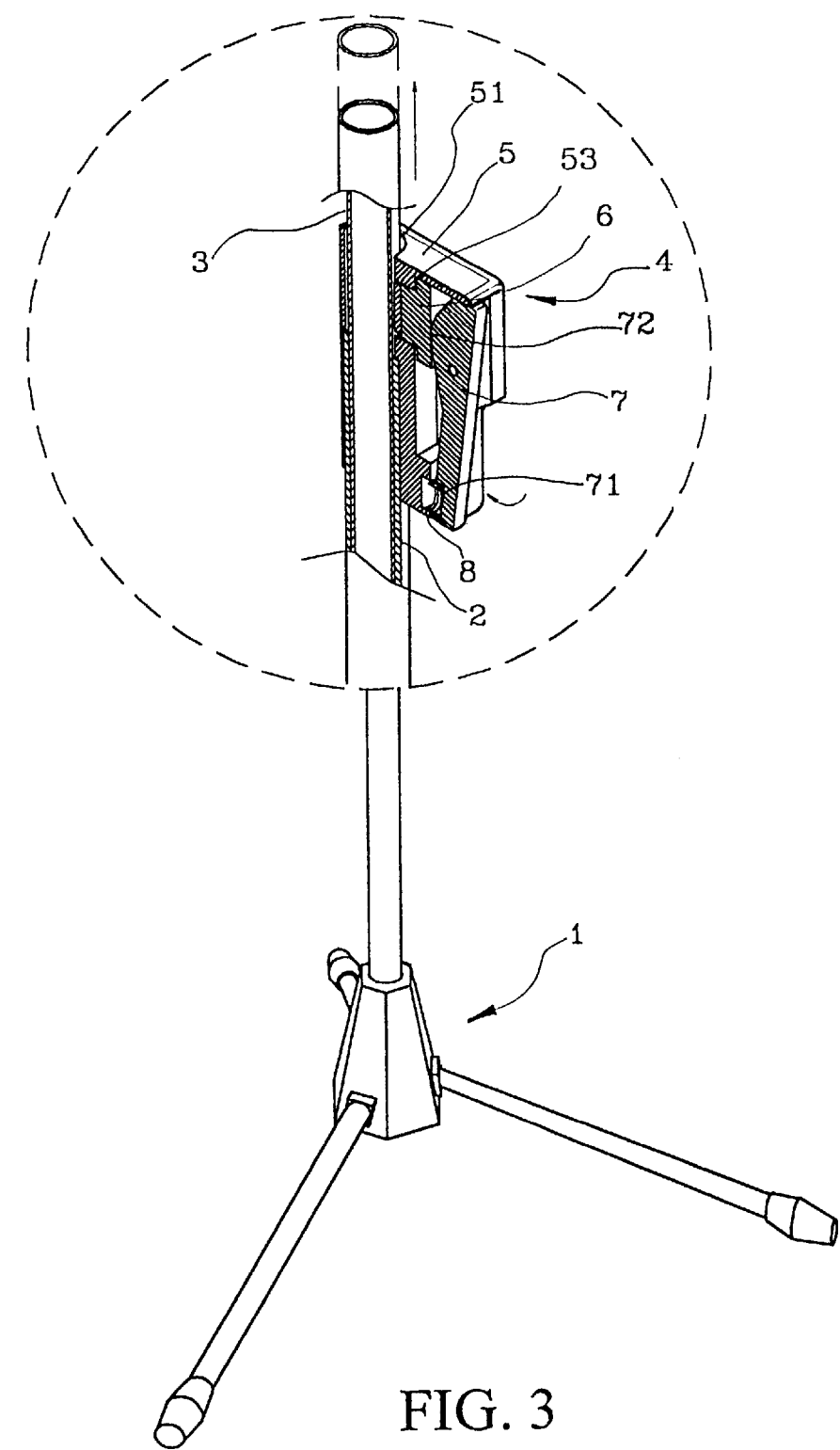
FIG. 3 is a perspective view of an embodiment of the fixing joint with the press lever being pressed.

Referring to FIGS. 1 through 3, the subject invention of an "improvement on microphone stand elevating device", comprises mainly a base stand 1, an outer tube 2, an inner tube 3 and a fixing joint 4; wherein, the outer tube 2 is installed on the base stand 1; the inner tube 3 is installed on the outer tube 2, with its top to fix a microphone holder.

The subject invention is characterized as a fixing joint 4, comprising a main body 5, a fixing block 6 and a press lever 7, wherein:

The main body has a through hole 51 on a verticle side; the inner diameters of the upper half and the lower half of said through hole 51 respectively correspond to the diameters of the inner tube 3 and the outer tube 2; so the main body 5 is mounted on the top end of the outer tube 2 and outside the inner tube 3; one the other side of said main body 5 is a depressed chamber 52; on the upper part of the depressed chamber 52 is an open hole 53 communicating with the through hole 51; on the lower part of the depressed chamber 52 is a jut part 54; on the jut part 54 is a recess hole 55.

On the front of fixing block 6 is a pushing part 61; said pressing part 61 corresponds to the open hole 53 in the depressed chamber 52, and its front part slightly extending into the through hole 51; so the fixing block 6 may be fitted on the open hole 53 in the depressed chamber 52; and, the top of said pushing part 61 is in a concave arc shape with a soft pad 62.

The center part of the pressing lever 7 is hinge joined to the center part of the depressed chamber; inside the bottom of said pressing lever 7 is a recess 71; between the recess 71 and the recess hole 55 of the main body 5 is a compressed spring 8; so the front part 72 of the pressing lever 7 may push against the fixing block 6.

The above composition is illustrated in FIG. 2; the spring force from the compressed spring 8 is applied on the bottom part 73 of the pressing lever 7; so the front part 72 of the pressing lever 7 tightly pushes the fixing block 6; so the pushing part 61 at the front of the fixing block 6 in turn tightly pushes the inner tube 3, to fix the inner tube 3 tightly in the fixing joint 4; then, as illustrated in FIG. 3, when the bottom part 73 of the pressing lever 7 is pressed, the front part 72 of the pressing lever 7 escapes the fixing block 6, so the fixing block 6 may move to enable the movement of the inner tube and the adjustment of its height; thus achieving the functions of convenient, simple and rapid adjustment of the height of the microphone stand.

Summing up, the subject invention indeed has its inventive step and originality, which has not yet been disclosed in any publications; so it will satisfy the requirements in Article 95 of the Patent Law.

It is hereby declared that the above description, covering merely the preferred embodiment, should not be based to limit or restrict the subject claim, and that all equivalent structural and/or configured variations and/or modifications made by anyone skilled in the subject trade, deriving from the subject description with drawings and contents therein, should reasonably be included in the intent of the subject invention and the subject claim.

I claim:

1. A microphone stand elevating device comprising a base stand, an outer tube having an outer tube diameter, an inner tube having an inner tube diameter, and a clamping joint, the outer tube being installed on the base stand, the inner tube being installed within the outer tube with its top end adapted to mount a microphone, wherein the clamping joint comprises:

a main body;

a clamping block;

an actuating lever; and a bias member, wherein said main body is mounted on said outer tube, said actuating lever is pivotally attached to said main body and is biased away from said main body by said bias member;

said clamping block disposed between said actuating lever and said inner tube;

said main body having a through hole having an upper inner diameter portion and a cavity adjacent said through hole, said cavity communicating with a cavity opening and having a cavity hole communicating with said upper inner diameter of said through hole, wherein said inner tube is slidingly received in said through hole upper inner diameter portion, and said clamping block is adapted to be slidingly received in said cavity hole, said clamping block being an elongated member having a front face arranged to conform to an outer arc-shaped face of the inner tube and oriented toward said inner tube, and an oppositely disposed back face arranged to abut said actuating lever, whereby in use, pressure applied to said actuating lever overcomes said bias, thereby releasing said clamping block from a normal clamping position abutting said inner tube and allowing said inner tube to freely slide within said main body.

2. The microphone stand elevating device of claim 1 further comprising:

a soft pad, wherein said soft pad is disposed between said clamping block front face and said inner tube.

3. The microphone stand elevating device of claim 1, wherein:

said bias member is a spring disposed between said main body and said actuating lever so as to bias said actuating lever away from said main body.

4. A microphone stand elevating device comprising a base stand, an outer tube having an outer tube diameter, an inner tube having an inner tube diameter and a clamping joint, the outer tube being installed on the base stand, the inner tube being installed within the outer tube with its top end adapted to mount a microphone, wherein the clamping joint comprises:

a main body;

a clamping block;

a soft pad;

an actuating lever; and a bias member, wherein said main body has a through hole, said through hole having an upper inner diameter adapted to slidingly receive said inner tube and a lower inner diameter adapted to receive said outer tube, said main body has a cavity adjacent said through hole and communicating with a cavity opening, said cavity having a cavity hole communicating with said upper inner diameter of said through hole, said actuating lever is pivotally attached to said main body, said actuating lever having a first end and a cam surface on a second end, said actuating lever being disposed within said cavity so that said cam surface is exposed through said cavity opening, said bias member is disposed between said main body and said acutating lever so as to bias said actuating lever first end away from said main body, said clamping block is adapted to be slidingly received in said cavity hole, said clamping block being an elongated member having a front face arranged to conform to an outer arc-shaped face of the inner tube and oriented toward said inner tube, and an oppositely disposed back face arranged to abut said actuating lever cam surface, said soft pad is disposed between said clamping block front face and said inner tube, whereby in use, pressure applied to said actuating surface overcomes said bias, thereby releasing said clamping block and said soft pad from a normal clamping position abutting said inner tube and allowing said inner tube to freely slide within said main body.

* * * * *